United States Patent [19]
Jordan

[11] 3,817,625
[45] June 18, 1974

[54] PHOTO ELECTRICAL SENSOR

[75] Inventor: Richard J. Jordan, Roseville, Mich.

[73] Assignee: KDI-BAUER Corporation, Warren, Mich.

[22] Filed: Oct. 15, 1971

[21] Appl. No.: 189,708

[52] U.S. Cl................... 356/141, 356/148, 356/152, 356/183, 356/206, 250/218, 350/160 R, 73/301, 73/405, 73/515
[51] Int. Cl....................... G01b 13/00, G01p 15/02
[58] Field of Search............ 356/28, 141, 148, 150, 356/152, 183, 204, 206; 350/160, 312, 315, 317; 250/218; 73/65, 179, 301, 499, 405, 515

[56] References Cited
UNITED STATES PATENTS

| | | | |
|---|---|---|---|
| 1,955,315 | 4/1934 | Styer | 250/218 X |
| 2,510,977 | 6/1950 | Hobelmann | 250/218 X |
| 2,791,932 | 5/1957 | Hall | 356/206 X |
| 3,436,188 | 4/1969 | Boyd et al. | 250/218 X |

*Primary Examiner*—David Schonberg
*Assistant Examiner*—Paul K. Godwin
*Attorney, Agent, or Firm*—Hauke, Gifford, Patalidis & DuMont

[57] ABSTRACT

A sensor providing an output as a function of the degree of deviation of a condition from a predetermined initial condition. The sensor consists of a housing for a pair of communicating columns of liquid fluid, a light source and means for projecting a beam of light axially through each column of liquid. Electro-optical light detecting means associated with each column of liquid are electrically interconnected so as to provide, as a result of initial calibration, a base reference in the form of an output electrical level corresponding to an initial or equilibrium condition. When the initial or equilibrium condition is disturbed, there results a differential change in the lengths of the columns of liquid causing in turn a differential variation of the amount of light detected by each light detector, thereby providing an excursion of the electrical output level from the base reference which is a function of the differential change in the lengths of the columns of liquid.

10 Claims, 6 Drawing Figures

PATENTED JUN 18 1974 3,817,625
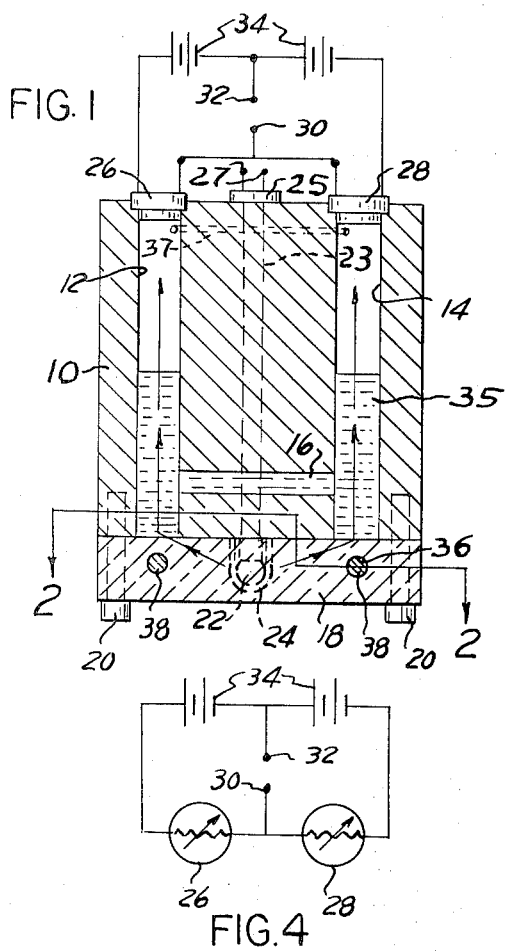
FIG. 1
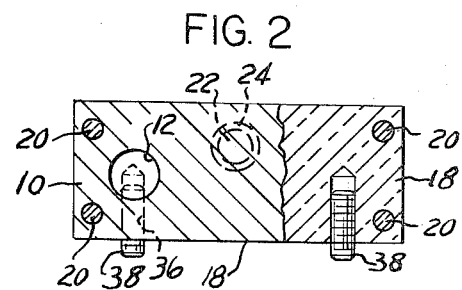
FIG. 2
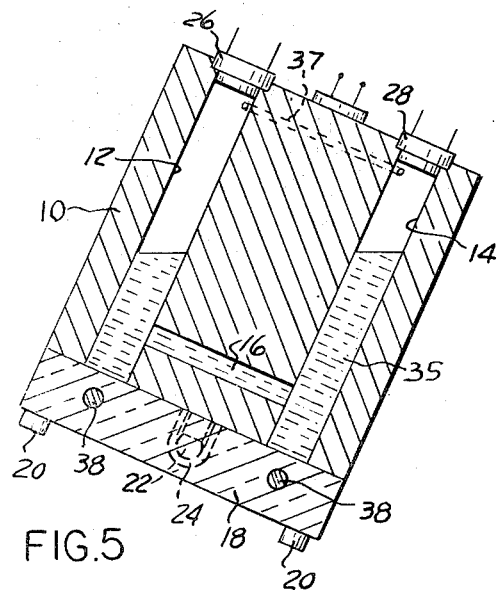
FIG. 4
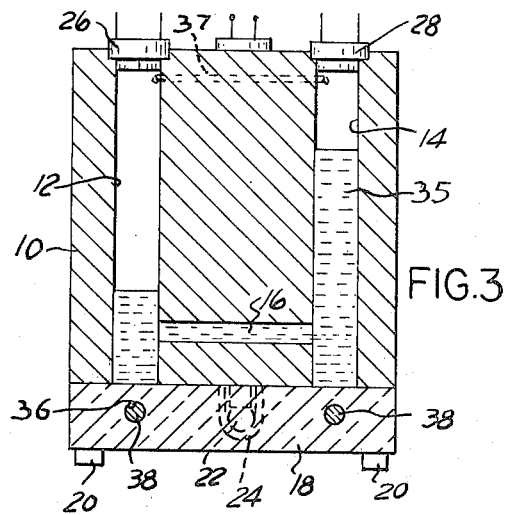
FIG. 3
FIG. 5
FIG. 6

3,817,625

PHOTO ELECTRICAL SENSOR

The sensor of the invention has many practical applications, examples of which include level and tilt indicators, accelerometers, differential pressure indicators, and the like.

BACKGROUND OF THE INVENTION

Sensors for providing a visual or electrical output as a function of the degree, or of the rate, of change from a predetermined initial equilibrium condition have a multiplicity of applications in a variety of fields. Gyroscope stabilized platforms have been used in ordnance, in rocketry and in space navigation, for example, for defining reference planes, combined with appropriate sensors providing output signals proportional to the rate or amount of deviation from the reference planes. Inertia mass or pendulum actuated tilt indicators may also be used in ordnance, rocketry, and space navigation for determining the degree of tilt of a structure relatively to a natural or artificial gravitational field, or relatively to a true or false horizon.

The present invention provides a sensor having no mechanical moving parts and which can be adapted to provide an indication of the rate or amount of deviation from a predetermined initial or equilibrium condition. The present invention, therefore, has many uses which will be readily apparent to those skilled in the art, as the sensor of the present invention is capable of providing an output as a function of the degree of disturbance from such an initial equilibrium condition, or zero reference, irrespective of whether such change is a change in motion, orientation, pressure or the like.

SUMMARY OF THE INVENTION

The present invention has for its principal object to sense a change from predetermined initial conditions and to provide a signal which is an analog representation of the degree or rate of change from such predetermined initial conditions. Because the present invention does not utilize any moving part, except columns of liquid fluid, the sensor of the invention is subject to very little, if any, hysteresis or losses due to friction between moving parts, or due to acceleration and deceleration of important masses while in normal functioning. Once calibrated, which calibration is effected by substantially simple mechanical means, the sensor of the present invention provides repetitive accurate measurements of the action which it is desired to sense, without being affected by conditions other than those which it is desired to sense, such as temperature changes, power supply voltage variations, and the like.

The many objects and advantages of the present invention will become apparent to those skilled in the art when the following description of the best mode contemplated for practicing the invention is considered in conjunction with the accompanying drawings wherein:

BRIEF DESCRIPTION OF THE DRAWINGS

FIG. 1 is a schematic representation in section of an example of a sensor according to the present invention;

FIG. 2 is a transverse sectional view substantially along line 2—2 of FIG. 1;

FIG. 3 is a schematic illustration similar to FIG. 1 useful in explaining the operation of the sensor of the invention;

FIG. 5 is a schematic illustration of the sensor of the invention functioning as a level or tilt indicator;

FIG. 6 is a schematic representation of a modification of the invention functioning as a differential pressure sensor.

DETAILED DESCRIPTION OF THE PREFERRED EMBODIMENTS

Referring now to the drawings and more particularly to FIGS. 1-2 thereof, a sensor according to the present invention is illustrated as comprising a housing 10, made of any appropriate material non-transmissive of light such as metal or opaque plastic, provided with a pair of longitudinal bores shown respectively at 12 and 14. In the structure illustrated, the two bores 12 and 14 are substantially parallel to each other, but it will be apparent from the description hereinafter that such an arrangement is for convenience only, and the bores 12 and 14 may be mutually disposed in any convenient manner, at an angle to each other, or in different planes, for example, as long as they are placed in fluid communication by means of a passageway such as shown at 16. The lower end of the bores 12 and 14 is obturated by means of an end plate 18 attached to the lower end of the housing 10, as illustrated, by way of screws or bolts 20. The end plate 18 is made of a light transmissive material, preferably a light transmissive plastic such as plexiglass or the like, and the surface of the block of light transmissive material forming the end plate 18 is coated with a light reflective paint, such as white paint or the like, except on the face thereof abutting on the end of the housing 10. A light bulb 22 is disposed in a recess 24 formed in the end plate 18, the recess 24 being preferably substantially equidistant from the ends of both bores 12 and 14 formed in the housing 10. The light bulb 22 and appropriate wiring to the light bulb may be dropped through a bore 23 formed in the housing 10 closed at its upper end by a plug 25 provided with bulb wiring terminals 27 for appropriate connection to a power supply, not shown.

The upper end of each bore 12 and 14 is provided with a light detector element such as a photo-emitter, a photo-resistor or a photo-conductor. For example, a pair of photo-resistor cells 26 and 28 such as cadmium selenide cells, may be cemented as shown, on the upper end of the bores 12 and 14 and electrically interconnected so as to provide a common output terminal 30, the second output terminal 32 consisting of the center tap of a DC power supply 34. It can thus been that the photo-cells 26 and 28 are therefore connected in series in a circuit which includes the power supply 34 and that, as long as the resistances, or conductivities, of the two photo-cells are equal, both output terminals 30 and 32 are at the same voltage level.

The bores 12 and 14 in the housing 10 are filled with a liquid fluid 35 to an appropriate level, by way of a fill plug, not shown. The level of the liquid in the two bores is the same in view of the fluid communication provided by the passageway 16 between the two bores 12 and 14, as long as the housing 10 is subjected to a verticaly directed gravitational field. The two bores 12 and 14 may be placed in commuication with each other above the level of the liquid by way of a passageway such as shown at 37 or, alternately, in communication with the ambient by means of appropriate vents (not shown). When the light bulb 22 is turned on, the block of light transmissive material forming the end plate 18 becomes illuminated and acts as a light source projecting a beam of light in each of the bores 12 and 14 which impinges upon each of the photo-cells 26 and 28.

At least one transverse threaded bore, or optionally two transverse threaded bores are formed in the end plate 18, as shown at 36, and a threaded member such as a set screw 38, which is provided with a light-absorbing surface finish such as a dark surface finish so as to be capable of acting as a light mask, is threadably engaged in the threaded bore 36, preferably below one or both bores 12 and 14 or at any other convenient position in the block of light transmissive material forming the end plate 18, such that by threading inwardly or outwardly the set screw 38 within the threaded bore 36 a portion of the light transmitted by the end plate 18 may be masked relatively to one of the bores 12 or 14. The set screw, or set screws, 38 thus provides a means for establishing a base reference voltage level at the output 30–32, such that uneven light transmission characteristics of the material forming the end plate 18, uneven radial light emission of the light bulb 22, unequal responses of the photo-cells 26 and 28, unequal lengths of the columns of liquid in the respective bores 12 and 14, or any other unequal conditions, are adequately compensated for during initial calibration. Once the sensor is calibrated such as to provide a predetermined base reference voltage across the output terminals 30–32, any disturbance from the initial equilibrium condition, represented at FIG. 1, which causes a difference of levels of the two columns of liquid, as represented at FIG. 3, and consequently a change in the relative height of the columns of liquid contained in the bores 12 and 14 from that of the initial equilibrium or calibration condition, is reflected by a change or excursion of the output level from the base reference output level.

The photo-cells 26 and 28 each behave as a variable resistor whose electrical resistance, or conductance, is proportional to the amount of light impinging thereupon. A change of the length of the respective columns of liquid in the bores 12 and 14, the condition illustrated at FIG. 3, results in a proportional decrease of the intensity of the light transmitted by the longer column of liquid and a corresponding relative increase of the light transmitted by the shorter column of liquid. Because the two photo-cells 26 and 28 electrically define a true potentiometer, the total resistance, or conductance, across the two photo-cells remains substantially constant, as is evident from FIG. 4 which represents the schematic electrical equivalent of the photo-cell electrical circuit, but as the resistance of one photo-cell decreases of the same amount as the resistance of the other photo-cell increases, there results a voltage level excursion at the terminal 30 relative to the fixed voltage level at the terminal 32, which provides an output signal which is an analog representation of the relative differential length of the two columns of liquid.

The liquid partly filling the bores 12 and 14 may be any convenient liquid such as for example a clear liquid in which has been dissolved a small amount of a light absorbing dye, such that the light absorbed by a column of liquid is directly proportional to the length of such column of liquid through which a beam of light is caused to pass. Alternately, the liquid may be a liquid substantially fully transmissive of light, but having an appropriate index of refraction such that the intensity of the light impinging upon the photo-cells 26 and 28 is inversely proportional to the length of the corresponding column of liquid, due to the optical quality of the liquid that causes the apparent diameter of the end of the bore 12 or 14 abutting against the surface of the translucent end plate 18 to be a function of the length of the column of liquid through which the light is transmitted. An example of such liquid is any of the dimethyl siloxane polymers (or silicone fluids), such as the Dow Corning 200 fluids manufactured by the Chemical Product Division of Dow Corning Corporation, Midland, Michigan, and which are available in diverse viscosity ranges and which are usable over a wide range of temperature.

Because the sensor of the invention is capable of sensing any variation from the calibrated initial equilibrium condition that causes a change in the level of the liquid in the two bores 12 and 14, the sensor of the invention has many applications, as will be obvious to those skilled in the art. For example, a transverse acceleration of the housing 10 from a predetermined initial equilibrium velocity will cause a change of level, or a change in the respective lengths of the columns of liquid in bores 12 and 14, as illustrated at FIG. 3. The sensor of the invention may thus be used as an accelerometer.

Because the two bores 12 and 14 in the housing 10 are in fluid communication by means of the passageway 16, the level of the liquid in the two bores tends to remain the same, irrespective of the orientation of the housing in a gravitational field. Thus a tilt of the housing 10 in the vertical plane containing the bores 12 and 14, FIG. 5, relatively to an initial position as shown at FIG. 1, causes a variation in the relative lengths of the respective columns of liquid contained in the bores 12 and 14. Consequently, the sensor of the invention may be utilized as a tilt indicator relatively to one vertical plane or axis, or as a tilt indicator relatively to several axes by disposing a sensor in each axis to be controlled.

As another example of applications, the sensor of the invention may be utilized as a differential pressure sensor, as schematically illustrated at FIG. 6. To make the sensor of the invention operate as a differential pressure indicator, the bores 12 and 14 in the housing 10 are hermetically sealed relative to the ambient, the passageway placing the bores in communication above the level of the liquid 35 is omitted, and the bore 12 and the bore 14 are placed in communication respectively to a source of pressure P1 and to a source of pressure P2 by way of ports 40 and 42, respectively. It is obvious that as long as P1 = P2, for example, the level of the column of liquid in the bore 12 will be the same as the level of the column of liquid in the bore 14. The sensor is calibrated for such condition. As soon as one pressure varies relative to the other, one column of liquid will become shorter while the other will be caused to become longer. For example, if the pressure P1 increases relatively to the pressure P2, the level of the liquid in the bore 12 will drop, while the level of the liquid in the bore 14 will rise, respectively, for example to the positions indicated in dotted lines in FIG. 6, such that an output signal will be provided by the sensor which is an analog representation of the differential change in the pressures being monitored.

It is obvious that when the sensor of the invention has its output connected to the input of a system accepting information in a digital form, an analog to digital converter is placed at the interface between the sensor and the utilization.

Many modifications within the scope of the invention will occur to those skilled in the art.

Therefore, the invention is not limited to the precise form and arrangement illustrated and described, but what is claimed as new is:

1. A sensor comprising a pair of communicating equi-level columns of liquid, means for longitudinally projecting a beam of light through each of said columns of liquid, electro-optical light detecting means associated with each of said columns of liquid for supplying an electrical output level as a function of the amount of light detected thereby, and calibration means comprising a light masking member adjustably projecting into one of said beams of light for originally establishing a base reference for said output level, whereby any deviations of said output level from said base reference is a function of a differential change in length of said columns of liquid causing a differential change in the amount of light detected by said light detecting means.

2. The sensor of claim 1 wherein said columns of liquid are disposed substantially in a vertical plane.

3. The sensor of claim 1 wherein said beams of light are obtained from a common light source.

4. The sensor of claim 3 wherein said common light source is disposed so as to illuminate a block of light transmissive material in contact with said columns of liquid.

5. A sensor comprising a housing, a pair of bores disposed in said housing, a third bore in said housing placing the bores of said pair in communication with each other, a liquid filling said bores to a predetermined common level above said third bore, a light source, means for projecting a beam of light from said light source through each of said bores of said pair from an end thereof, a pair of photo-cells having an electrical resistance varying as a function of the amount of light impinging thereon each disposed at the other end of each of said bores of said pair, said photo-cells being electrically connected in series with an electrical power supply, a first output terminal connected between said photo-cells, a second output terminal connected to a center tap of said power supply, and an adjustable light mask for adjustably varying the intensity of at least one light beam to establish a base reference for the electrical level across said output terminals for a predetermined equilibrium position of the level of liquid in each of said bores of said pair whereby a deviation of said electrical level from said base reference is an analog representation of the differential change of level of said liquid in said bores.

6. The sensor of claim 5 wherein said light source is disposed in a block of light transmissive material obturating said bores of said pair at the first mentioned end thereof.

7. The sensor of claim 5 further comprising venting means for venting each of said bores of said pair to ambient disposed above the level of the liquid in said bores.

8. The sensor of claim 5 wherein said photo-cells are photo-resistors.

9. The sensor of claim 5 wherein said photo-cells are photo-conductors.

10. The sensor of claim 6 wherein said light mask is a light absorbing threaded member threadably disposed in said block of light transmissive material in the path of one of said light beams.

* * * * *